US005555331A

United States Patent [19]
Billet et al.

[11] Patent Number: 5,555,331
[45] Date of Patent: Sep. 10, 1996

[54] DEVICE FOR CONNECTING OPTICAL FIBRES TO WAVEGUIDES FORMED IN A SUBSTRATE

[75] Inventors: Gilles Billet, Voiron; Huan B. Yin, Mennecy, both of France

[73] Assignee: Radiall, Rosny-Sous-Bois, France

[21] Appl. No.: 436,923

[22] Filed: May 9, 1995

[30] Foreign Application Priority Data

May 10, 1994 [FR] France .................... 94 05743

[51] Int. Cl.⁶ ............................................. G02B 6/30
[52] U.S. Cl. .................... 385/49; 385/14; 385/50; 385/52; 385/89; 385/90; 385/91; 385/53
[58] Field of Search .................... 385/14, 53, 54, 385/55, 63, 65, 71, 49, 50, 52, 76, 77, 80, 83, 136, 137, 89, 90, 91, 92

[56] References Cited

U.S. PATENT DOCUMENTS

| | | | |
|---|---|---|---|
| 4,150,870 | 4/1979 | d'Auria | 385/52 X |
| 4,639,074 | 1/1987 | Murphy | 385/52 X |
| 4,750,799 | 6/1988 | Kawachi et al. | 385/49 X |
| 4,796,975 | 1/1989 | Lukas et al. | 385/49 X |
| 4,969,704 | 11/1990 | Stanley | 385/52 X |
| 5,037,179 | 8/1991 | Bortolin et al. | 385/54 |
| 5,046,808 | 9/1991 | Chang | 385/49 X |
| 5,134,673 | 7/1992 | Stephenson et al. | 385/56 |
| 5,359,686 | 10/1994 | Galloway et al. | 385/49 X |
| 5,367,593 | 11/1994 | Lebby et al. | 385/49 X |
| 5,422,725 | 6/1995 | Vihelmsson | 385/52 X |
| 5,475,778 | 12/1995 | Webb | 385/31 |

FOREIGN PATENT DOCUMENTS

| | | | |
|---|---|---|---|
| 0429877 | 6/1991 | European Pat. Off. | 385/14 X |
| 0548882 | 6/1993 | European Pat. Off. | 385/48 X |
| 2696841 | 4/1994 | France | 385/53 X |

OTHER PUBLICATIONS

Patent Abstracts of Japan, vol. 13, No. 563 (P–975) 14 Dec. '89, JP–A–01 234 806.
Patent Abstracts of Japan, vol. 12, No. 460 (P–795) 5 Dec. '88, JP–A–63 183 404.

*Primary Examiner*—Brian Healy
*Attorney, Agent, or Firm*—Schweitzer Cornman & Gross

[57] ABSTRACT

Device for connecting at least one optical fiber to at least one integrated-optics waveguide which is formed within a substrate at a predetermined distance from one of the faces of the substrate constituting a reference plane, including a receptacle (2) capable of receiving the terminal portion of the optical fiber (8) and a planar support (3) capable of receiving the substrate (9) applied against said support (3) through its reference plane (9a), the receptacle (2) and the support (3) being arranged in such a manner that the axis of the waveguide (10) and the axis of the optical fiber (8) are situated in one and the same plane parallel to the reference plane (9a) of the substrate (9). It further includes a removable lateral abutment (5) capable of being positioned against the support (3) and against which the substrate (9) bears when it is accommodated within the support (3), said lateral abutment (5) being dimensioned in such a manner as to set the substrate (9) in a position in which the axis of the waveguide (10) coincides with that of the optical fiber (8).

8 Claims, 3 Drawing Sheets

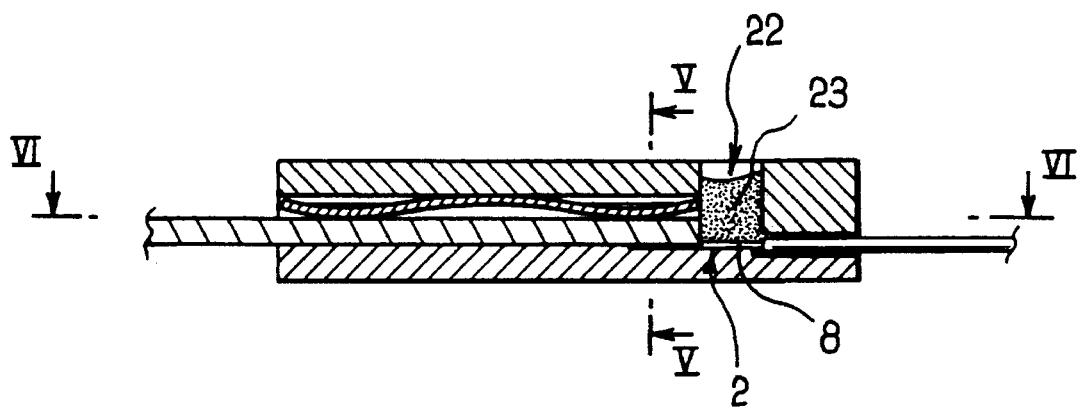
FIG_3
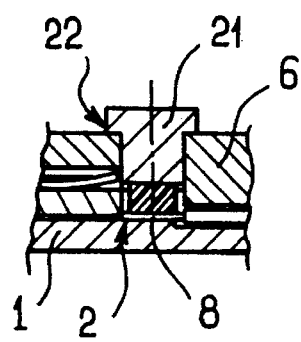
FIG_4
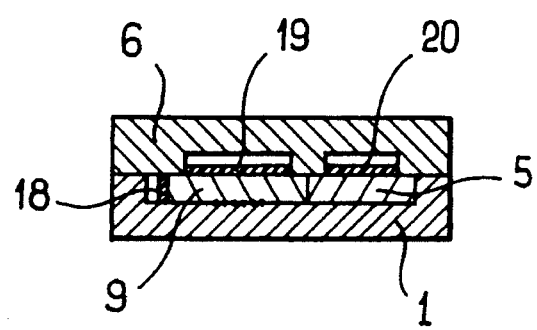
FIG_5
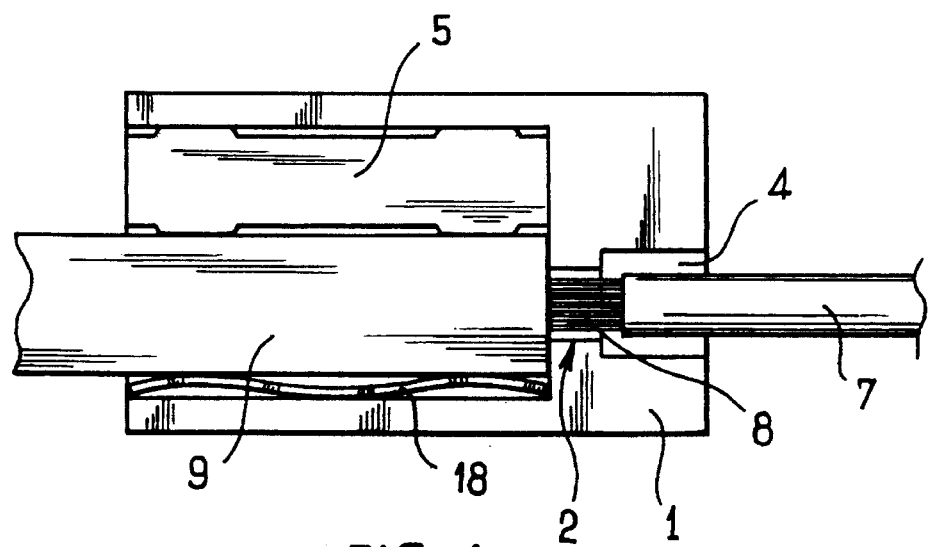
FIG_6

DEVICE FOR CONNECTING OPTICAL FIBRES TO WAVEGUIDES FORMED IN A SUBSTRATE

BACKGROUND OF THE INVENTION

The present invention relates to a device for connecting optical fibers to integrated-optics waveguides formed in a substrate.

With the advent of integrated-optics components such as, especially, couplers, multiplexers or switches, the problem arises of the connection of these components to optical fibers.

The main difficulty consists in conveniently positioning the substrate in which the waveguides are formed in relation to the fibers, the axes of the terminal faces of which have to coincide, with the greatest possible precision, with the axes of the waveguides of the substrate.

A process permitting the construction of such a connection is already known.

This process consists in constructing, within the thickness of the substrate and within the extension of each waveguide, V-shaped grooves in which the optical fibers are accommodated.

However, this process exhibits the significant disadvantage that the depth of the V grooves is lacking in precision; this may be reflected in a poor alignment of the axes of the fibers in relation to the axes of the waveguides.

SUMMARY OF THE PRESENT INVENTION

The object of the present invention is to provide a device permitting, in a reliable and repetitive fashion, the connection of one or more optical fibers to one or more integrated-optics waveguides formed in a substrate.

The subject of the present invention is a device for connecting at least one optical fiber to at least one waveguide which is formed within a substrate, at a predetermined distance from one of the faces of the substrate constituting a reference plane, including a receptacle capable of receiving the terminal portion of the optical fiber and a planar support capable of receiving the substrate applied against said support through its reference plane, the receptacle and the support being arranged in such a manner that the axis of the waveguide and the axis of the optical fiber are situated in one and the same plane parallel to the reference plane of the substrate, characterized in that it further includes a removable lateral abutment capable of being positioned against the support and against which the substrate bears when it is accommodated within the support, said lateral abutment being dimensioned in such a manner as to set the substrate in a position in which the axis of the waveguide coincides with that of the optical fiber.

In a particular embodiment of the invention, the receptacle is constituted by a V-shaped groove engraved directly in that face of the planar support against which the reference plane of the substrate is applied.

In the case where it is desired to connect a plurality of optical fibers to a plurality of parallel waveguides, the device according to the invention includes, in a preferred embodiment, a receptacle equipped with a plurality of parallel grooves, each being intended to receive the terminal portion of an optical fiber, said optical fibers thus immobilized within the receptacle exhibiting between them the same spacing as the parallel waveguides formed in the substrate.

The device according to the invention permits the optical fibers to be aligned, with precision, with the waveguides formed in the substrate, by reason of the fact that the problem of the alignment of the fibers, along the direction perpendicular to the reference plane of the substrate, is separated from the problem of the alignment of the fibers along the direction parallel to the reference plane of the substrate.

In fact, the construction of the receptacle on which the terminal portions of the fibers are immobilized may be easily accomplished with sufficient precision to ensure, on the one hand, that the axes of the fibers immobilized within the receptacle are coplanar and, on the other hand, that the plane containing the axes of the fibers is situated at a predetermined distance d1 from the planar support.

Thus, provided that, by construction, the distance d2 which separates the axis of the waveguides from the reference plane of the substrate is known precisely, it is sufficient to proceed in such a manner that the distance d1 is equal to the distance d2 in order to ensure the coplanarity of the axes of the optical fibers and of the axes of the waveguides.

Moreover, according to the invention, the lateral abutment permits the substrate to be positioned along the second direction defined hereinabove, which is parallel to the reference plane of the substrate.

By using a set of a plurality of abutments of differing widths, it is possible, by successive trials, to determine which abutment permits the accomplishment of the best optical signal transmission between the optical fibers and the waveguides.

For the purpose of facilitating an understanding of the invention, a description will now be given of an embodiment thereof, which is given by way of non-limiting example with reference to the accompanying drawing in which:

DESCRIPTION OF THE DRAWING

FIG. 3 is a view in axial cross-section of a device according to second embodiment of the invention, FIG. 4 is a view in cross-section similar to FIG. 3 of a detail of the device of FIG. 1, FIG. 5 is a view in cross-section along V—V of FIG. 3, FIG. 6 is a view in cross-section along VI—VI of FIG. 3.

DETAILED DESCRIPTION OF THE INVENTION

Figure 1:
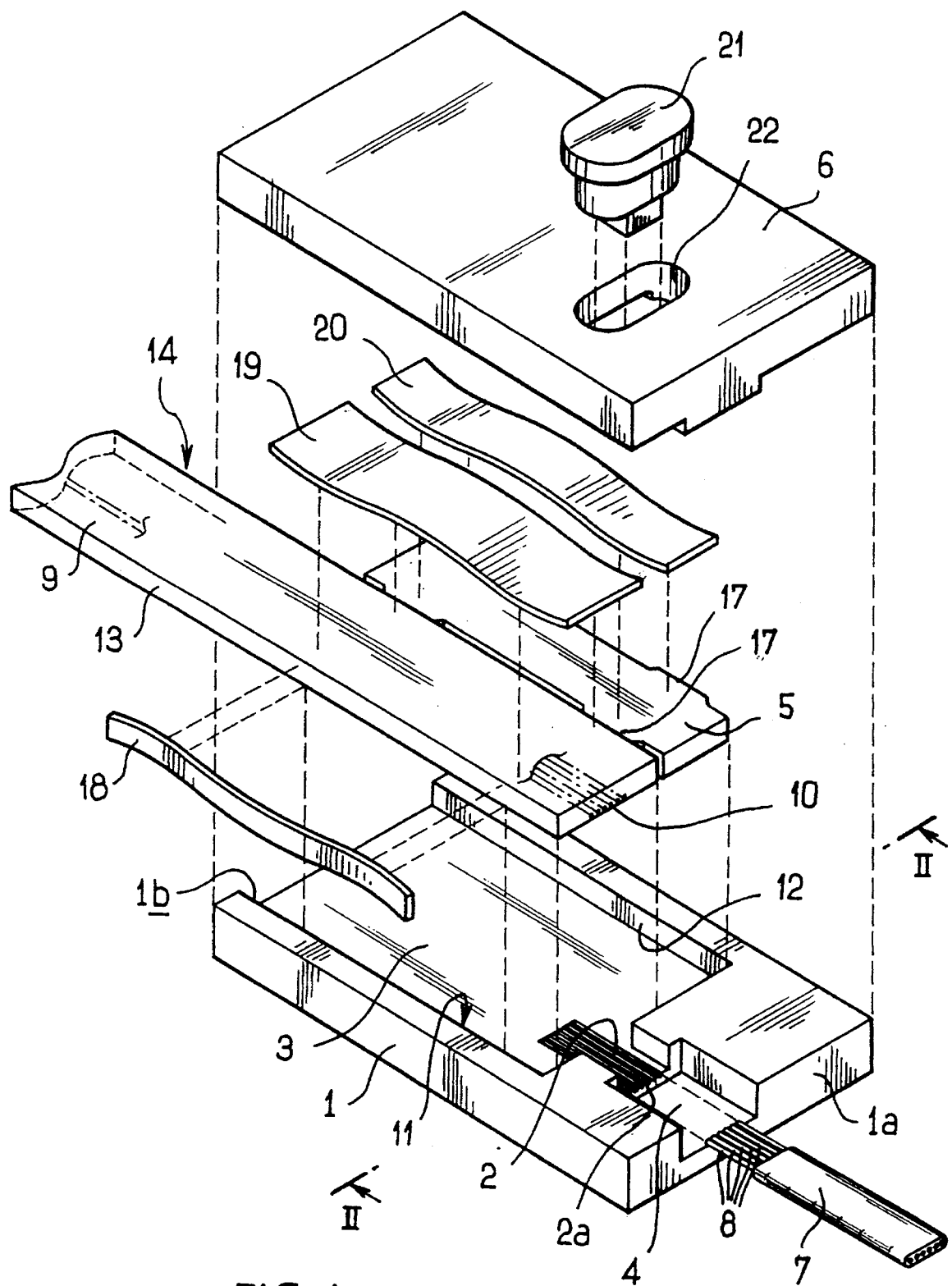
FIG. 1 is an exploded perspective view of a device according to a first embodiment of the invention.

The device shown includes a base 1 in which there are defined a portion forming a receptacle 2 and a portion forming a support 3 within the meaning of the invention.

These two portions 2, 3 are the direct product of the manufacture of the base 1.

A channel 4 aligned with the receptacle 2 opens in the front face 1a of the base, while the support 3 opens in the rear face 1b of the base.

According to the invention, a lateral abutment 5 which is presented here in the form of a precision setting wedge, is capable of being positioned on the support 3.

The device likewise includes a closure cap 6.

The channel 4 is intended to receive the terminal portion of a flat sheathed bundle 7 of parallel optical fibers 8.

In order to connect these optical fibers 8 to the waveguides 10 of a substrate 9, the terminal portion of the fibers 8 is stripped and each one of these terminal portions is placed in one of the V-shaped grooves, 2a, of that portion of the base 1 which forms the receptacle 2.

Figure 2:
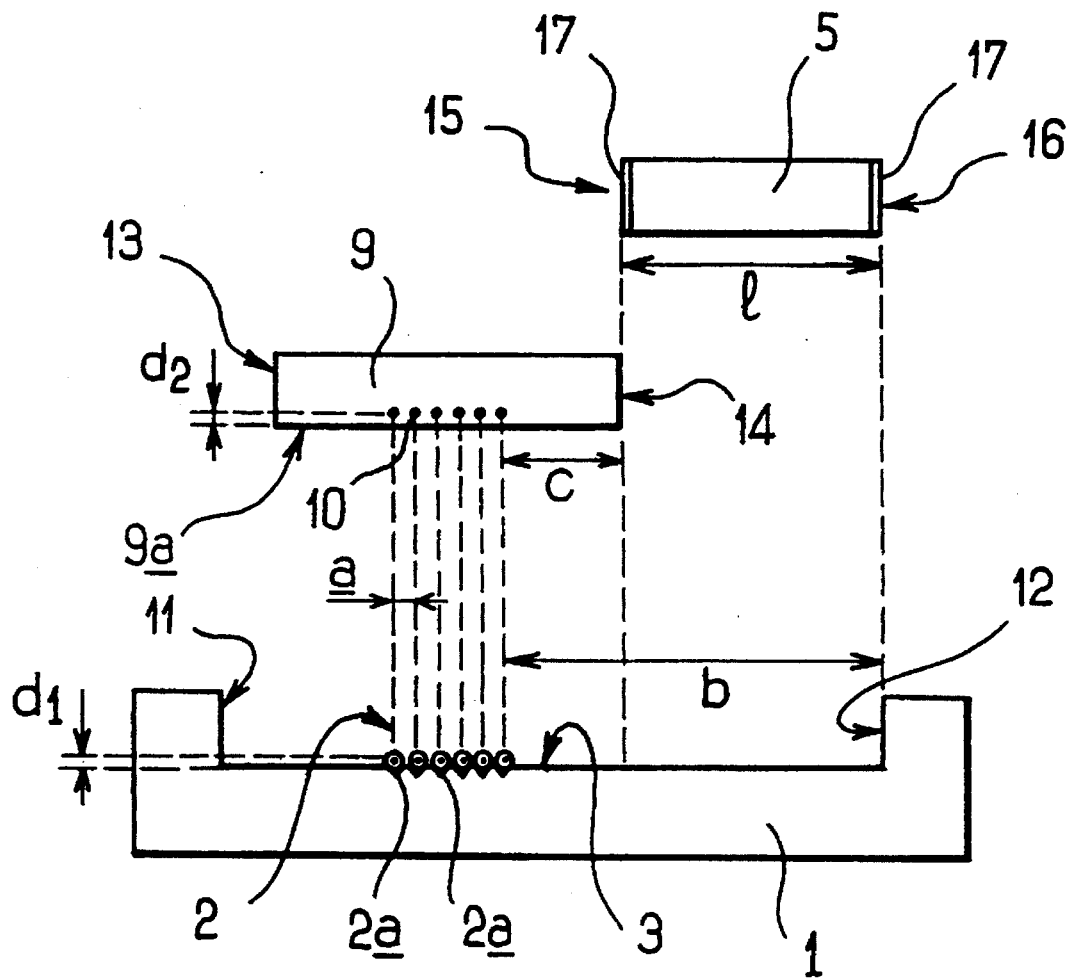
FIG. 2 is a view in cross-section along II—II of FIG. 1.

According to a particular embodiment of the invention, the V-shaped grooves, 2a, are engraved directly in the face of the support 3, in such a manner that the axes of the optical fibers 8 accommodated within said V-shaped grooves are coplanar and that the plane containing these axes is situated at a predetermined distance d1 from the planar support 3, as is seen FIG. 2.

In the example shown, the spacing of the V-shaped grooves, 2a, is such that the distance which separates the axes of the fibers 8 is constant and equal to that which separates the axes of the waveguides 10 of the substrate 9.

By construction, the distance d2 which separates the coplanar axes of the waveguides 10 from the reference plane 9a of the support 9 is known with precision.

In consequence, the construction of the V-shaped grooves, 2a, in such a manner that the distance d1 is equal to the distance d2 eliminates the problem of the coplanarity of the axes of the optical fibers 8 and of the axes of the waveguides 10, and this is so without having to intercalate any intermediate piece between the substrate 9 and the planar support 3.

In the embodiment shown, the support 3 is laterally bounded by two parallel planar edges 11, 12.

As the substrate 9 is parallelepipedic, it likewise includes two parallel planar lateral faces 13, 14.

The precision setting wedge 5 also exhibits a parallelepipedic general shape.

On its two lateral faces 15 and 16, the precision setting wedge 5 exhibits excess-thickness portions 17, which are adjusted by a fine machining to fix the overall width of the setting wedge 15 at a predetermined value l.

By construction, the distance c which separates the lateral face 14 of the substrate from the axis of the waveguide 10 which is closest to this lateral face 14 is known with precision.

By construction of the base 1, the distance b which separates the edge 12 of the support 3 from the axis of the fiber 8 which is closest to the edge 12 is likewise known with precision.

Knowing the distances b and c, it is sufficient to machine the precision setting wedge 5 in order to impart to it an overall width l=b−c in order to ensure the alignment of the axes of the optical fibers 8 with the axes of the waveguides 10.

It is moreover possible to provide a set of a plurality of thickness-setting wedges 5 of differing widths, in such a manner as to be able to interchange the setting wedges until the best quality of transmission of the optical signal between the optical fibers 8 and the substrate 9 is obtained.

A leaf spring 18 is intercalated between the lateral face 13 of the substrate 9 and the edge 11 of the support 3 to push back the substrate 9 against the precision setting wedge 5, which bears on the edge 12.

In order to immobilize the substrate 9 and the setting wedge 5, two other leaf springs 19 and 20 are likewise intercalated between the substrate 9 and the closure cap 6 on the one hand and between the precision setting wedge 5 and the closure cap 6 on the other hand.

Once closed, the closure cap 6 can be made integral with the base 1 by adhesive bonding.

The terminal portions of the optical fibers 8 can be immobilized in the V-shaped grooves, 2a, of the receptacle 2 with the aid of an elastomer runner 21 which is accommodated within a through passage 22 of the closure cap 6 situated in line with the receptacle 2.

The cross-sectional view of FIG. 4 shows the elastomer runner 21 engaged in the orifice 22 of the closure cap 6, which exerts a pressure on the fibers 8 to immobilize them in the receptacle 2 of the base 1.

FIG. 3 shows a second embodiment of the invention, in which embodiment the terminal portion of the fibers 8 is immobilized on the receptacle 2 with the aid of an adhesive 23 which is placed in position in the through passage 22 after closure of the cap 6.

It is fully understood that the embodiments which have just been described do not exhibit any limiting character, and that they may receive any desirable modifications without nevertheless departing from the scope of the invention.

We claim:

1. A device for connecting at least one optical fiber to at least one integrated-optics waveguide which is formed within a substrate at a predetermined distance from one of the faces of the substrate constituting a reference plane, including a receptacle (2) capable of receiving the terminal portion of the optical fiber (8) and a planar support (3) capable of receiving the substrate (9) applied against said support (3) through its reference plane (9a), the receptacle (2) and the support (3) being arranged in such a manner that the axis of the waveguide (10) and the axis of the optical fiber (8) are situated in one and the same plane parallel to the reference plane (9a) of the substrate (9), said device further including a removable lateral abutment (5) capable of being positioned against the support (3) and against which the substrate (9) bears when it is accommodated within the support (3), said lateral abutment (5) being dimensioned in such a manner as to set the substrate (9) in a position in which the axis of the waveguide (10) coincides with that of the optical fiber (8).

2. A device according to claim 1, wherein the receptacle is constituted by a V-shaped groove (2a) engraved directly in that face of the planar support (3) against which the reference plane (9b) of the substrate (9) is applied.

3. A device according to claim 1 for connecting a plurality of optical fibers (8) to a plurality of parallel waveguides (10), wherein the receptacle (2) is equipped with a plurality of parallel grooves (2a), each being intended to receive the terminal portion of an optical fiber (8), said optical fibers (8) thus immobilized within the receptacle (2) exhibiting between them the same spacing as the parallel waveguides (10) formed within the substrate (9).

4. A device according to claim 1, including an elastic element (18) which pushes back the substrate (9) against the lateral abutment (5).

5. A device according to claim 1, including an elastomer runner (21) capable of being applied onto the terminal portions of the fiber or fibers (8) accommodated within the receptacle (2) while exerting a pressure on said optical fiber or fibers (8).

6. A device according to claim 1, including an empty space (22) above the terminal portions of the optical fiber or fibers (8), which space is capable of being filled with an adhesive (23) to immobilize said optical fiber or fibers (8) within said receptacle (2).

7. A device according to claim 1, including a closure cap (6) which covers the support (3) and the receptacle (2).

8. A device according to claim 7, including elastic elements (19, 20) between the closure cap (6) on the one hand and the substrate (9) and the lateral abutment (5) respectively on the other hand.

* * * * *